United States Patent [19]

Schenk et al.

[11] 3,779,874

[45] Dec. 18, 1973

[54] NICKEL ELECTROPLATING BATHS

[75] Inventors: Walter Schenk, Bad Duerkheim; Friedrich Hovemann, Hockenheim, both of Germany

[73] Assignee: Badische Anilin- & Soda-Fabrik Aktiengesellschaft, Ludwigshafen/Rhein, Germany

[22] Filed: Oct. 13, 1972

[21] Appl. No.: 297,199

Related U.S. Application Data

[62] Division of Ser. No. 193,996, Oct. 29, 1971, Pat. No. 3,730,854.

[52] U.S. Cl. ................................................. 204/49
[51] Int. Cl. .......................... C23b 5/08, C23b 5/46

[58] Field of Search .......................... 204/49, DIG. 2

[56] References Cited
UNITED STATES PATENTS
2,712,522   7/1955   Kardos et al.......................... 204/49

Primary Examiner—G. L. Kaplan
Attorney—Richard L. Johnston

[57] ABSTRACT

Stabilized aqueous solutions of aliphatic unsaturated sulfonic acids which contain aliphatic chlorine compounds, and nickel-plating baths containing said stabilized aqueous solutions as brighteners.

5 Claims, No Drawings

NICKEL ELECTROPLATING BATHS

This is a division of application Ser. No. 193,996 filed Oct. 29, 1971, now U.S. Pat. No. 3,730,854.

This invention relates to stablized aqueous solutions of aliphatic unsaturated sulfonic acids or salts thereof. Unsaturated aliphatic sulfonic acids, which include for example vinyl sulfonic acid and allyl sulfonic acid, are mainly used as brighteners for nickel-plating baths and as comonomers in the polymerization of, say, acrylonitrile, styrene, acrylic acid, methyl acrylate, methyl methacrylate, maleic acid or N-vinylpyrrolidone.

Their use as brighteners for nickel-plating baths is particularly important and is described in German Printed Applications 1,173,762; 1,063,003 and 1,066,069, U.S. Pat. No. 2,800,442, French Patent 1,185,579 and German Patent 845,731.

Unsaturated sulfonic acids are used in the form of aqueous solutions of the free acids or salts thereof. During storage, these aqueous solutions form polymerization products, some of which are insoluble in water. When unsaturated aliphatic sulfonic acids are used as comonomers, it is necessary to filter the aqueous solutions immediately before use, which means loss of material. The manufacture of brighteners with unsaturated aliphatic sulfonic acids and acetylene alcohols, such as butyne-2-diol-1,4, has the disadvantage that these mixtures also form polymerization products. Such polymerization products lead to an increase in the consumption of the brighteners, since the polymeric compounds are insoluble in nickel-plating electrolytes and do not act as brighteners. One important drawback is that these polymerization products are deposited on the article being nickel-plated and thus interfere with the plating process.

There are very many ways of stabilizing monomer solutions, which include solutions of water-soluble unsaturated aliphatic sulfonic acids, by means of polymerization inhibitors.

The polymerization inhibitors used are compounds which, due to their chemical structure, are capable of absorbing the free radicals which are liberated during free-radical polymerization. Hitherto, amines, aldehydes, monohydric or polyhydric phenols and ketones have been regarded as suitable. In the case of solutions of aliphatic unsaturated sulfonic acids or sulfonates there is the further requirement that the polymerization inhibitors used should be water-soluble and should not adversely affect the use of sulfonic acids or sulfonates as copolymers or their use as brighteners for nickel-plating baths.

It is an object of the invention to provide stable solutions of aliphatic unsaturated sulfonic acids or salts thereof which contain inhibitors which do not cause discoloration. It is a further object to provide solutions from which copolymers of excellent color may be obtained. Yet another object is to provide aqueous solutions of aliphatic unsaturated sulfonic acids which may be used, after storage, in nickel-plating baths without filtration of said aqueous solutions being necessary. Finally it is an important object of the invention to enable such stabilized solutions to be used as bighteners in nickel-plating baths to obtain non-discolored bright nickel deposits without impairing the electroplating action.

In accordance with the invention, these and other objects and advantages are achieved by stabilized aqueous solutions of aliphatic unsaturated sulfonic acids or salts thereof which contain an aliphatic saturated chlorine compound of from one to four carbon atoms in a concentration of from 0.2 to 8 percent by weight, based on the pure sulfonic acid or salt thereof.

The chloride compounds to be used are aliphatic, saturated chlorine compounds having from 1 to 4 chlorine atoms associated with homopolar bonds and containing from one to four carbon atoms. Specific example are methylene chloride, chloroform, carbon tetrachloride, 1-chloroethane, 1,1-dichloroethane, 1,1,1-trichloroethane, ethylene chloride, 1,1,2,2-tetrachloroethane, 1,1-dichloropropane, 1,2-dichloropropane, 1,3-dichloropropane, 1,2,3-trichloropropane, 1,1,2-trichloropropane, 1-chlorobutane, 2-chlorobutane and 3-chlorobutane. We prefer to use methylene chloride, 1,2-ethylene chloride and 1,2-dichloropropane, ethylene chloride being particularly important commercially.

Water-soluble unsaturated aliphatic sulfonic acids are those containing two or three carbon atoms, such as allyl sulfonic acid and vinyl sulfonic acid, the latter being preferred.

The salts thereof are equally suitable and indeed are to be preferred owing to their better solubility in water. Suitable salts are the alkali metal salts, for example the sodium and potassium salts, and the alkaline earth metal salts such as the calcium and magnesium salts, and heavy metal salts, such as the iron, nickel and cobalt salts. The alkali metal salts are preferred, the sodium salts being particularly important commercially.

The aqueous solutions conveniently contain from 10 to 75 and preferably from 20 to 60 percent by weight of sulfonic acids or salts thereof based on the aqueous solution. Commercially available forms are 25 to 50 percent solutions. To these solutions there are added to chlorine compounds proposed by the invention in amounts of from 0.2 to 0.8 percent and preferably from 0.32 to 0.8 percent by weight of the pure sulfonic acid or salt thereof, depending on the concentration of the solution.

The unsaturated aliphatic sulfonic acids may be readily copolymerized with known monomers in the aqueous solutions stabilized in the manner proposed by the present invention. No discoloration of the copolymers or reaction delays can be observed.

When the solutions of the invention are to be used in nickel-plating baths, the aqueous solution stabilized in the manner proposed by the invention is conveniently added to a Watts nickel electrolyte in an amount ranging from 0.1 to 0.3 percent by weight of the nickel electrolyte, which also contains from about 0.01 to 0.1 percent of its weight of an acetylene alcohol as convenient brightener, for example hexyne-3-diol-2,5, 1,4-bis-(2-hydroxyethoxy)-2-butyne or, preferably, butyne-2-diol-1,4.

Highly satisfactory results are obtained even when the added brightener consists of an aqueous solution of unsaturated aliphatic sulfonic acids which has been stored for a long time, this being due to the stabilization achieved in the present invention.

In the following Examples, the difference between the conventional solutions and those of the invention is illustrated.

EXAMPLE 1

1,000 parts of a 25 percent aqueous solution of the sodium salt of vinyl sulfonate and containing no further additive were placed in a glass tube, which was sealed by fusion of the glass to prevent evaporation of the water. The whole was then stored at 40°C for 120 days. The hydrogenation iodine number fell from 50 to 35 and the color changed from pale yellow to brown.

To 1,000 parts of a 25 percent aqueous solution of the sodium salt of vinyl sulfonate there were added 10 parts of ethylene chloride. The ethylene chloride dissolved completely to form a clear solution. This solution was placed in a glass tube, which was sealed by fusion of the glass to prevent evaporation losses. The whole was stored at 40°C for hydrogenation iodine number remained at 50 and the color also remained unchanged.

EXAMPLE 2

1,000 parts of a 25 percent aqueous solution of the sodium salt of vinyl sulfonate were placed in a quartz bulb and irradiated with a 300 w mercury vapor lamp. Whereas the hydrogenation iodine number of the unstabilized product fell from 50 to 36 and its color changed from pale yellow to dark brown, the iodine number of a sample containing 10 parts of ethylene chloride fell from 50 to only 48 and its color changed from pale yellow to yellow when subjected to the same conditions.

In a test carried out under the same conditions, 10 parts of hydroquinone were used in place of the 10 parts of ethylene chloride. Immediately, the color of the product changed to dark brown and the hydrogenation iodine number fell from 50 to 45.

EXAMPLE 3

Ten parts of butyne-2-diol-1,4 were dissolved in 40 parts of a 25 percent vinyl sulfonate solution. A parallel specimen was prepared in like manner except that 0.5 percent of ethylene chloride was added to the vinyl sulfonate solution. About 20 parts of each solution were placed in separate thick-walled glass tubes each containing a glass sphere having a diameter equal to the internal diameter of the glass tube, whereupon the tubes were sealed by fusion. At the commencement of the experiment the falling time of the glass spheres was 7.5 seconds. After storage of the tubes at room temperature for 4 weeks, the falling time in the unstabilized vinyl sulfonate solution was 8.9 seconds, whilst it was 7.6 seconds in the stabilized solution. This increase in viscosity is due to the formation of polymerization products. Visual examination of the brighteners also revealed that no precipitates were present in the tube containing the stabilized vinyl sulfonate but that yellowish brown precipitates were present in the tube containing the unstabilized vinyl sulfonate solution.

EXAMPLE 4

A Watts nickel electrolyte of the following composition:

300 g/l of nickel sulfate ($NiSO_4 \cdot 7H_2O$)
45 g/l of nickel chloride ($NiCl_2 \cdot 6H_2$))
41 g/l of boric acid ($H_3BO_3$)

was prepared, and 1.2 g/l of the above brighteners were added. Degreased brass plates of grade Ms 63 were nickel-plated therein at 60°C in a parallel cell at a current density of 5 amps/dm$^2$. Bright deposits having a flawless mirror finish were obtained but only when stabilized vinyl sulfonate was used.

We claim:

1. An aqueous Watts nickel electroplating electrolyte comprising 0.01 to 0.1 percent by wt. of an acetylenic alcohol and 0.1 to 0.3 percent by wt. of an additive composition comprising 10–75 percent by wt. of an unsaturated sulfonic acid or salts thereof and 0.2 to 0.8 percent by wt. (based on the sulfonic acid or salts thereof) of a saturated aliphatic chlorine compound having from one to four carbon atoms and from one to four chlorine atoms in the molecule.

2. Nickel plating baths as claimed in claim 1 in which said solution contains salts of unsaturated aliphatic sulfonic acids.

3. Nickel plating baths as claimed in claim 1 in which said saturated aliphatic chlorine compound is methylene chloride, chloroform, carbon tetrachloride, 1-chloroethane, 1,1-dichloroethane, 1,1,1-trichloroethane, ethylene chloride, 1,1,2,2-tetrachloroethane, 1,1-dichloropropane, 1,2-dichloropropane, 1,3-dichloropropane, 1,2,3-trichloropropane, 1,1,2-trichloropropane, 1-chlorobutane, 2-chlorobutane, 3-chlorobutane or mixtures thereof.

4. Nickel plating baths as claimed in claim 1 in which said saturated aliphatic chlorine compound is methylene chloride ethylene chloride or 1,2-dichloropropane.

5. Nickel plating baths as claimed in claim 1 in which said saturated aliphatic chlorine compound is ethylene chloride.

* * * * *

UNITED STATES PATENT OFFICE
CERTIFICATE OF CORRECTION

Patent No. 3,779,874         Dated December 18, 1973

Inventor(s)  Walter Schenk et al.

It is certified that error appears in the above-identified patent and that said Letters Patent are hereby corrected as shown below:

Column 4, line 10, "($NiCl_2 \cdot 6H_2$))" should read --($NiCl_2 \cdot 6H_2O$) --; line 43, before "ethylene" insert a comma.

Signed and sealed this 26th day of November 1974.

(SEAL)
Attest:

McCOY M. GIBSON JR.
Attesting Officer

C. MARSHALL DANN
Commissioner of Patents